United States Patent [19]

Elrick et al.

[11] 4,337,103
[45] Jun. 29, 1982

[54] COMPOSITE PROPELLANT WITH DIFFERENTIALLY CURED AREA AT INITIAL BURN SURFACE

[75] Inventors: Donald E. Elrick, Rawlings; Harry Gilbert, Cumberland, both of Md.

[73] Assignee: Hercules Incorporated, Wilmington, Del.

[21] Appl. No.: 781,282

[22] Filed: Dec. 4, 1968

Related U.S. Application Data

[63] Continuation-in-part of Ser. No. 667,623, Sep. 6, 1967, Pat. No. 3,948,698.

[51] Int. Cl.³ .............................................. C06B 45/10
[52] U.S. Cl. ....................................... 149/19.9; 149/2; 149/19.6; 149/19.92; 149/20
[58] Field of Search .................. 149/19, 2, 19.6, 19.9, 149/19.92, 20; 264/3; 102/103

[56] References Cited

U.S. PATENT DOCUMENTS

| | | | |
|---|---|---|---|
| 3,147,161 | 9/1964 | Abere et al. | 149/19 |
| 3,177,190 | 4/1965 | Hsieh | 260/94.2 |
| 3,305,523 | 2/1967 | Burnside | 149/19 X |
| 3,417,059 | 12/1968 | Hoffman | 149/19 X |

*Primary Examiner*—Edward A. Miller
*Attorney, Agent, or Firm*—Michael B. Keehan

[57] ABSTRACT

Composite rocket propellants, in which the base component is a functionally terminated rubber, and case-bonded rocket motors containing same, are provided, wherein cross-link density at, and adjacent at least a portion of the initial propellant burning surface is lower than that throughout the remainder of the propellant to provide greater strain capability at the initial burning surface together with greater propellant strength for higher mass ratio and improved case bonding than possible utilizing a single "compromise" propellant cross-link density of the prior art.

Method is provided which involves initially curing the entire propellant mass, alone or as a rocket motor component, to the initial low cross-link density and thereafter applying to said initial burning surface, an interferent capable of interfering with the cure process to substantially stop same, and then again subjecting the entire propellant to curing conditions to cure the remaining curable propellant portion to the higher cross-link density.

5 Claims, No Drawings

COMPOSITE PROPELLANT WITH DIFFERENTIALLY CURED AREA AT INITIAL BURN SURFACE

This application is a continuation-in-part of our copending application Ser. No. 667,623, filed Sept. 6, 1967, now U.S. Pat. No. 3,948,698.

This invention relates to composite functionally terminated rubber base rocket propellants having varied cross-link density to impart increased strain capability at the initial propellant burning surface and increased strength throughout the remainder of the propellant for greater mass ratio. In another aspect this invention relates to case-bonded propellant rocket motors in which the propellant is that above described, and wherein in addition to the improved propellant properties above described, the integrity of the burning system is improved to provide for a correspondingly stronger case bond. In another aspect the invention relates to method for the manufacture of such rocket motors, and propellants per se. Other aspects will be apparent in light of the accompanying disclosure and the appended claims.

Solid propellant compositions, as propellants for projectiles, are fast burning oxidizer-fuel systems comprising a solid oxidizer, and a binder system to support the propellant ingredients uniformly throughout the propellant mass and to also serve as a fuel. Upon incorporation of all ingredients into the final propellant mixture, it (the propellant mixture) is maintained under time and temperature curing conditions to form the finished propellant product.

Composite type propellants are rubber based and contain natural rubber, or synthetic rubbery polymers or copolymers as the binder component. The binder, or binder system, as it may be referred to, comprises not only the rubbery base material but also all associated ingredients to enable it to function in that capacity such as a suitable plasticizer, curing agent, catalyst when needed for curing, setting agent, antioxidant, and the like. In some instances suitable filler materials are utilized, i.e. reinforcing agents as, for example, carbon black, clays, silica, burning rate catalysts, and the like. These materials along with the oxidizer component of the propellant are dispersed evenly throughout the rubbery binder component and upon curing the mixture all ingredients are evenly dispersed throughout the gel network. Curing is generally carried out after the final ingredient mixture has been emplaced in a suitable mold so that upon completion of the curing reaction the propellant is in the desired shape for use.

In the manufacture of case bonded propellant rocket motors, the propellant is generally cured while supported in a suitable mold which serves as the casing for the cured propellant. Under such curing conditions, the inner wall of the intended casing is coated with a suitable adhesive which, during the curing step, becomes bonded to the propellant and hence the term "case bonded" propellants. Bonding of propellant to casing is required in order to preclude burning of the propellant along the grain surface adjacent the casing, which would disturb the burning equilibria and greatly impair the ballistics. In the manufacture of case-bonded propellants, the initial burning surface is generally that forming a port area within the propellant for uniform radial burning, and is formed by suitable configuration molding equipment during curing.

In our parent application we have disclosed and claimed epoxy cured carboxy terminated rubber base composite propellants, and method for their manufacture; in our copending application Ser. No. 736,929, filed June 4, 1968, now U.S. Pat. No. 3,982,975 a continuation-in-part of said parent, such composite propellants containing selected phenylenediamine antioxidant components are disclosed and claimed; in our copending application, Ser. No. 781,283, filed Dec. 4, 1968, now U.S. Pat. No. 3,984,265, a continuation-in-part of said parent, epoxy cured carboxy terminated butadiene base composite propellants containing certain synergistic antioxidant mixture components, and antioxidants per se are disclosed and claimed; and in our copending application Ser. No. 781,285, filed Dec. 4, 1968, now U.S. Pat. No. 4,241,661, are disclosed and claimed epoxy cured carboxy terminated rubber type composite propellants, their manufacture, and rocket motors containing same, having an antioxidant stain on the initial burning surface to provide improved strain capability and resistance to oxidative hardening at the burning surface.

In the radial burning of case bonded propellant rocket motors, mass ratio, i.e. the ratio of the propellant weight to the total weight of the motor, is one factor which determines the amount of thrust and total energy output and the strain that is imposed on the port surface area of the propellant due to pressurization upon burning, and to temperature difference between cure temperature and the lowest temperature that the motor encounters. In the past, mass ratio in composite propellant rocket motors, has been unduly limited by a lack of sufficient strain capability of the propellant at the port surfaces due to the imposed strains, above described. Thus, attempts to improve total thrust by increase in mass ratio have led to failure in propellant structure due to excessive strains on the port walls. Another problem encountered in the firing of case bonded rocket motors of the composite propellant type has been the integrity of the propellant at or near the case bond, which upon failure leads directly to faulty ballistics.

Cross-link density, i.e. degree of cross-linking of the rubber base of the binder component, in composite propellant type motors, is a major factor which determines both strain capability and tensile strength. However, increase in cross-link density leads to decrease in strain capability simultaneously with increase in strength. Thus, attainment of optimum strain capability and tensile strength in rocket motors of this type cannot be accomplished at one and the same cross-linking density. At the initial burning surface, optimum strain capability depends upon relatively low cross-link density whereas high tensile strength and modulus throughout the remainder of the propellant requires relatively high cross-link density. Cross-link density in accordance with standard practice has been uniform throughout the propellant mass. Accordingly, a compromise cross-link density level has been used for each application. The compromise level is sufficiently low to provide suitable mechanical properties for an acceptable degree of strain capability at the initial burning surface but still sufficiently high to provide an acceptable tensile strength and modulus throughout the remainder of the propellant to assure adequate strength at or near the bond where the stresses are very high. Hence, the result has been a compromise of propellant motor properties, at the expense of higher strain capabilities and higher tensile strengths that have been potentially available but have not been accomplished heretofore.

This invention is concerned with composite functionally terminated rubber base propellants, and their manufacture, having strength greater than that possible heretofore at a given strain capability level, and which are accordingly operable at correspondingly higher mass ratios. The invention is further concerned with case-bonded propellant rocket motors, and their manufacture, in which the propellant is that above described, and which are therefore not only operable at higher mass ratio but, due to the propellant strength and accompanying integrity of the propellant burning system, have correspondingly stronger case bonds.

In accordance with the invention, a case bonded composite propellant rocket motor, in which the propellant base is a functionally terminated rubber, is provided, wherein the cross-link density of said propellant at, and adjacent, at least a portion of the initial burning surface is lower than that throughout the remainder of the propellant; said lower cross-link density being sufficient to impart strain capability of predetermined magnitude to said propellant at said surface, and the cross-link density throughout said remainder of the propellant being sufficiently high to impart strength of predetermined magnitude to said propellant to maintain integrity of same at, and adjacent, the case bond. Further in accordance with the invention, a process is provided for the manufacture of a case bonded composite propellant rocket motor having improved strain capability at the initial burning surface and improved strength for integrity of same at, and adjacent, the case bond, said process comprising maintaining an assembly of a rocket motor case together with an initially uncured composite propellant supported therein for curing and bonding to said case, said propellant having a functionally terminated rubber base; effecting cure of said propellant in its entirety, while supported as described, to a sufficient degree of cross-link density to provide a predetermined strain capability at the initial propellant burning surface; thereafter applying to at least a portion of said initial burning surface an interferent material capable of, and in an amount for, interfering with process of said cure at said surface to substantially stop same; again subjecting said supported propellant in its entirety to curing conditions therefor to sufficiently increase cross-link density of the remaining curable portion thereof for increased strength of said propellant and integrity thereof at, and adjacent, the case bond.

Still further in accordance with the invention, composite rocket propellants in which the propellant base is a functionally terminated rubber are provided, wherein the cross-link density of said propellant at, and adjacent, at least a portion of the initial burning surface is lower than that throughout the remainder of the propellant; said lower cross-link density being sufficient to impart strain capability of a predetermined magnitude to said propellant at said surface, and the cross-link density throughout said remainder of the propellant being sufficiently high to impart strength of predetermined magnitude to said propellant for operability of same at a correspondingly higher level of mass ratio. Still further in accordance with the invention, a process is provided for the manufacture of functionally terminated rubber base composite rocket propellants having a predetermined strain capability at the initial burning surface and an increased strength throughout substantially the remainder of the propellant for operability at a corresponding increase in mass ratio, comprising effecting cure of said propellant, in its entirety, to a sufficient degree of cross-link density to provide a predetermined strain capability at the initial propellant burning surface; thereafter applying to at least a portion of said initial burning surface an interferent material capable of, and in an amount for, interfering with process of said cure at said surface to substantially stop same; again subjecting said propellant in its entirety to curing conditions therefor to sufficiently increase cross-link density of the remaining curable portion thereof to provide for said increased propellant strength.

In preferred practice of method of the invention, which is applied to manufacture of the rocket motor above described, the propellant is formulated and the rocket motor components assembled by adding all propellant ingredients, including curing agent and curing catalyst, if utilized, to the intended rocket motor case containing suitable configuration molds including molding means for forming a port within, and generally extending through, the propellant. The resulting assembly of motor components, i.e. the casing and propellant ingredients therein is then placed in a suitable curing oven and maintained therein under time and temperature conditions for effecting partial cure of the propellant formulation to a sufficient degree of cross-link density to provide the propellant with low modulus and high elongation properties for a predetermined strain capacity at the port wall burning surface, i.e. at the initial burning surface. The cross-link density at this stage is uniform throughout the propellant mass and is not sufficiently high to also impart the necessary tensile strength to the remainder of the propellant, and particularly for adequate strength of the propellant at or near the case bond. At this stage of cure, the assembly of motor components, with partially cured propellant, is removed from the curing oven and the port configuration mold removed therefrom. The interferent material is then applied in solution at ambient temperatures (generally in the order of from 60° to 90° F.) to the port walls in an amount suitable for interrupting the curing reaction along the port wall surface to substantially stop same when the cure is continued. Therefore, when the motor component assembly is again placed in the curing oven, there is substantially no further increase in cross-link density at and near the port wall surface. The effect of the interferent material generally applies not only on the propellant surface that forms the port, but for a measurable distance into the port wall, dependent on the degree of absorption of interferent material into the propellant mass which in turn depends, to an extent, on the amount of interferent material initially added.

After the interferent material is applied to the port wall, the assembly of motor components is returned to the oven for curing, generally under about the same cure conditions as those of the first stage, to cure the propellant which has not been in contact with the interferent to thereby increase cross-link density to impart a predetermined increase in tensile strength to the propellant. The cross-link density at the port wall surface remains substantially unchanged during the second curing stage to permit the strain capability to be higher than permissible when utilizing the "compromise" cross-link density value of the prior art, and the tensile strength of the remaining portions of the propellant can be increased to values higher than those permitted by the prior art's compromise cross-link density value. Accordingly, the invention, by providing higher tensile strength in the mass of propellant, without adverse effect on strain capability at the burning surface, permits the use of higher mass ratios with accompanying increase in total thrust and energy output. Increased mass ratio can be readily accomplished by maintaining the standard propellant dimension except for reduction of the port cross-section.

The propellant per se, and as a component of a rocket motor assembly, in practice of the invention, contains on a weight basis from about 60 to 90 percent of solid oxidizer and from about 5 to 20 percent binder. The binder is any suitable functionally terminated rubber cured with a suitable curing agent, often in the presence of a catalyst for the curing reaction. The cross-link density of the propellant is generally sufficiently low at, and adjacent, the initial burning surface to there impart when measured at 77° F. a propellant modulus of from 200 to 600 psi, and an elongation at maximum stress in the order of from 40 to 100 percent; and is sufficiently high throughout the remaining propellant mass to there impart a higher modulus, generally in the order of from 400 to 2000 psi, and a lower elongation at maximum stress of from about 15 to 40 percent as measured at 77° F. These differences in mechanical properties, i.e. between those at the burning surface and throughout the remainder of the propellant provide for mass ratios as high as 0.9:1 in large motors, and in some instances higher. By comparison, the compromised overall cross-link density of the prior art would generally impart correspondingly lower modulus and elongation properties to accomplish a maximum mass ratio in the order of about 0.6 to 0.8 in large motors.

Exemplary functional rubber base binder components, in practice of the invention, include carboxy terminated rubbers, hydroxy terminated rubbers, mercapto terminated rubbers and amino terminated rubbers.

Suitable curing agents for the curing reaction are well known, as for example, polyisocyanates for hydroxy-, mercapto-, and amino-terminated rubbers, and diepoxide/triepoxide mixtures for carboxy terminated rubbers. Other well known curing agents include acyl, aryl, and sulfonyl aziridines for carboxy terminated rubbers, aziridinyl phosphine oxides for carboxy terminated rubbers and epoxides for amino terminated rubbers.

Often a curing catalyst is advantageously utilized for the curing reaction, as for example certain metal salts for carboxy terminated rubbers-epoxide curing reactions; zirconium acetyl acetonate or boron trifluoride for carboxy terminated rubber-aziridinyl curing reactions; ferric acetyl acetonate, lead salts such as lead 2-ethyl hexoate or tin salts such as dibutyl tin diacetate, for hydroxy terminated rubber-polyisocyanate curing reactions.

The interferent material utilized, depends, of course, on the particular curing reaction including not only the functionally terminated rubber but the curing agent and catalyst, if one is utilized. The interferent materials are those which react along one of several routes, viz., by reaction with functional groups of the rubber, reaction with the curing agent, or with the catalyst, to remove a particular component from the curing reaction, i.e., at the coated burning surface. Exemplary interferent materials are monofunctional isocyanates which react with functional groups of hydroxy-, mercapto-, and amine-terminated rubber base materials; monofunctional epoxides and monofunctional imines which react with carboxyl groups of carboxy terminated rubbers, monofunctional acids which react with epoxy groups of epoxy curing agents or the imine group of the aziridinyl curing agent and chelating agents which react with metal curing catalysts, particularly in conjunction with epoxy-carboxy terminated system. It is also necessary that a monofunctional interferent be appreciably more reactive than the corresponding polyfunctional group, with the remaining group of the curing system.

The following are exemplary of specific functional terminated rubbers, curing system and interferent material, in practice of the invention:

| | Terminated Rubber | Curing Agent | Curing Catalyst, if any | Interferent Material | Function of Interferent Material |
|---|---|---|---|---|---|
| 1 | Carboxy terminated polybutadiene | Diepoxide/triepoxide | Chromium 2-hexanoate | 8-Hydroxyquinoline | Reacts with metal of the catalyst |
| 2 | Hydroxy terminated polybutadiene | Diisocyanate | Dibutyl tin diacetate | Perfluoro phenyl isocyanate | Reacts with OH groups of the rubber. |
| 3 | Mercapto terminated rubber | Diisocyanate | Dibutyl tin diacetate | Perfluoro phenyl isocyanate | Reacts with OH groups of the rubber. |
| 4 | Amino terminated rubber | Diisocyanate | None | Perfluoro phenyl isocyanate | Reacts with $NH_2$ groups of the rubber |
| 5 | Carboxy terminated polybutadiene | Epoxides | CrOct | Trichloroacetic acid | Reacts with epoxide groups |
| 6 | Carboxy terminated polybutadiene | Epoxides | CrOct | Methyl 3,4-epoxy cyclohexanoate | Reacts with acid groups of the rubber. |
| 7 | Carboxy terminated polybutadiene | Aziridinyl agent | None | Trichloroacetic acid | Reacts with aziridinyl groups |
| 8 | Carboxy terminated polybuta- | Diepoxide triepoxide | CrOct | 8 Hydroxyquinoline | Reacts with metal ion of the catalyst. |

| Terminated Rubber | Curing Agent | Curing Catalyst, if any | Interferent Material | Function of Interferent Material |
|---|---|---|---|---|
| diene | | | | |

Any suitable rocket motor casing of the prior art can be utilized in practice of the invention. However, wound filament type casings are particularly advantageously utilized in view of their light weight and high tensile strength. Any suitable bonding lacquer at the casing inner wall surface can be utilized, it generally being advantageous that the bonding lacquer be of composition the same as, or similar to, that of the propellant binder, in accordance with standard practice.

The functionally terminated rubber base materials of the propellant formulations, in practice of the invention, can be prepared in any suitable well known manner. For example, hydroxy terminated polybutadiene can be prepared by anionic polymerization with termination by water; mercapto terminated polybutadiene can be prepared by anionic polymerization with termination by hydrogen sulfide and; amino terminated polybutadiene can be prepared by anionic polymerization with ammonia termination.

Now-preferred composite propellants per se, and of the rocket motor assemblies, of the invention are those in which the rubber base is a carboxy terminated rubber, generally a carboxy terminated polybutadiene or a carboxy terminated polyisobutylene cured by reaction with a mixture of di- and tri-epoxides in the presence of a chromium catalyst, as for example chromium 2-hexanoate.

Thus the now-preferred binder component generally contains a suitable antioxidant, say, 1 to 3 parts per 100 parts, such as a phenylenediamine as disclosed and claimed in my copending application, Ser. No. 736,929, filed June 4, 1968, above referred to, together with any plasticizer therefor and any additional antioxidant as result of its presence in the polymerization system from which the carboxy terminated rubber per se was recovered. Preferably, the propellant compositions contain about 70 to about 90 weight percent solid oxidizer, about 5 to about 10 percent metal fuel and from about 5 to about 20 weight percent binder. The binder includes the carboxy terminated rubber, the epoxide mixture and the catalyst, as well as any plasticizer, if present. From about 40 to about 95 weight percent of the binder in the preferred formulation is the carboxy terminated rubber, and from about 1 to about 10 weight percent is the epoxide mixture, while the plasticizer can be from 0 to about 50 weight percent, and preferably from about 20 to 40 percent by weight of the binder.

The preferred propellant generally contains one or more additional materials such as a metal fuel and ingredients commonly employed in making composite propellants such as reinforcing agents, wetting agents, surfactants, ballistic modifiers, radar attenuators, burning rate modifiers and the like. The propellant is prepared by intimately blending or mixing, in the intended motor case, the ingredients using conventional techniques and standard equipment well known to those skilled in the art as suitable for the purpose.

The epoxide curing agent in preferred practice is a mixture of difunctional epoxides and trifunctional expoxides and the curing reaction is carried out in the presence of a curing catalyst, both also disclosed in the above said application.

The carboxy terminated rubber component of the binder, in preferred practice, is an elastomeric polymer containing on the average about 2 free carboxy groups per polymer molecule and is preferably a homopolymer of an olefin such as isobutylene or a conjugated diene containing 4 to 8 carbon atoms, such as butadiene-1, 3, isoprene, octadiene-1, 3, and the like, a copolymer of more than 1 olefin or conjugated diene, such as an ethylene-propylene copolymer, a copolymer of a conjugated diene with other copolymerizable monomers which are preferably vinyl-substituted aromatic compounds such as styrene, the 1- or 2-vinyl naphthalenes and their alkyl, aryl, alkoxy, cycloalkyl, alkaryl, aralkyl, aryloxy, and dialkyl amino derivatives, or a mixture of any of the above homopolymers or copolymers.

The carboxy terminated rubbers can be produced in known manner from the above monomers, as, for example, by carrying out the polymerization in the presence of, as initiators, organoalkali metal compounds of the formula $RM_2$, where R is an aliphatic, cycloaliphatic, or aromatic hydrocarbon radical, M is an alkali metal such as sodium, potassium, lithium, cesium, or rubidium, and n is 2 to 4, and then replacing the alkali metal atoms on the ends of the polymer molecule with COOH groups by reacting with carbon dioxide and then hydrolyzing. Polymers containing 2 or more carboxyl groups per polymer molecule can be prepared by polymerizing an unsaturated carboxylic acid containing a single carbon to carbon double bond, such as acrylic, methacrylic, itaconic, vinyl acetic, oleic, fumaric, maleic, and like acids with itself or with a different copolymerizable monomer such as for example a different unsaturated acid, an olefin or a conjugated diene, according to any of the known methods.

The carboxy terminated rubbers which are particularly useful in practice of this invention are the carboxy terminated polymers of butadiene and isobutylene, and have molecular weights ranging from about 1,000 to about 20,000, and preferably from about 1500 to about 10,000.

The binder system of the invention is, in preferred practice, the polymeric binder formed by curing, in the presence of certain metal salts, which are catalysts for the carboxyl-epoxide reaction, the carboxy terminated rubber with an all-epoxide curing agent which is a mixture of diepoxides and triepoxides having a diepoxide:triepoxide mole ratio of from about 15:1 to 1:1, and preferably from 3:1 to 1:1. Maintenance of the ratio of the difunctional epoxides to the trifunctional epoxides within the above ranges is important to the production of propellants having a satisfactory mechanical property balance since below the ratio of 1:1 the propellant elongation is low, and above the ratio of 15:1 the propellant tensile strength is low.

The diepoxides of the mixture contain two epoxide groups per molecule and are the saturated or unsaturated aliphatic, cycloaliphatic, aromatic or heterocyclic diepoxides which also contain, if desired, non-interfering substituents. Preferred diepoxides are the aliphatic diepoxides containing 4 to 30 carbon atoms, the cycloaliphatic diepoxides containing 12 to 40 carbon atoms and the diglycidyl ethers of dihydric phenols. Typical diepoxides include butadiene dioxide; 1,2,5,6-diepoxyhexane; diglycidyl ether, diglycidyl ether of 1,3-butanediol; 1,8-bis(2,3-epoxypropoxy)octane; 1,4-bis(2,3-epoxypropoxy)cyclohexane; 1,4-bis(3,4-epoxybutoxy)-2-chlorocyclohexane; the di(epoxycyclohexanecarboxylates) of aliphatic diols exemplified by the bis(3,4-epoxycyclohexanecarboxylate) of 1,5-pentanediol, 3-methyl-1,5-pentanediol, 2-methoxymethyl-2,4-dimethyl-1,5-pentanediol, ethylene glycol, 2,2-diethyl-1,3-propanediol, 1,6-hexanediol and 2-butene-1,4-diol; the oxyalkylene glycol epoxycyclohexanecarboxylates exemplified by bis(2-ethylhexyl-4,5-epoxycyclohexane-1,2-dicarboxylate) of dipropylene glycol, bis(3,4-epoxy-6-methylcyclohexanecarboxylate) of diethylene glycol and bis(3,4-epoxycyclohexanecarboxylate) of triethylene glycol; the epoxycyclohexylalkyl epoxycyclohexanecarboxylates exemplified by 3,4-epoxycyclohexylmethyl 3,4-epoxycyclohexanecarboxylate, 3,4-epoxy-1-methylcyclohexylmethyl 3,4-epoxy-1-methyl-cyclohexanecarboxylate, 3,4-epoxy-2-methylcyclohexylmethyl 3,4-epoxy-2-methylcyclohexanecarboxylate, 3,4-epoxy-6-methylcyclohexylmethyl 3,4-epoxy-6-methylcyclohexane-carboxylate, (1-chloro-3,4-epoxycyclohexan-1-yl)methyl 1-chloro-3,4-epoxycyclohexanecarboxylate, (1-bromo-3,4-epoxycyclohexan-1-yl)methyl 1-bromo-3,4-epoxycyclohexanecarboxylate and (1-chloro-2-methyl-4,5-epoxycyclohexan-1-yl)methyl 1-chloro-2-methyl-4,5-epoxycyclohexanecarboxylate; epoxycyclohexylalkyl dicarboxylates exemplified by bis(3,4-epoxycyclohexylmethyl)pimelate and oxalate and bis(3,4-epoxy-6-methylcyclohexylmethyl)maleate, succinate, sebacate and adipate; epoxycyclohexylalkyl phenylene-dicarboxylates exemplified by bis(3,4-epoxycyclohexylmethyl)terephthalate; bis(3,4-epoxy-6-methylcyclohexylmethyl)-diethylene glycol ether; vinyl cyclohexene dioxide; diepoxide of dicyclohexene; dicyclopentadiene dioxide; bis(2,3-epoxycyclopentyl)ether; glycidyl 2,3-epoxycyclopentyl ether; 2,3-epoxycyclopentyl 2-methyl-glycidyl ether; 1,2,5,6-diepoxy-3-hexyne; 1,3-bis(2,3-epoxypropoxy)benzene; 1,4-bis(2,3-epoxypropoxy)benzene; 1,3-bis(4,5-epoxypentoxy)-5-chlorobenzene; 4,4′-bis(2,3-epoxypropoxy)diphenylether; 2,2-bis(2,3-epoxypropoxyphenyl)methane; 2,2-bis[p-(2,3-epoxypropoxy)-phenyl]propane, i.e., the diglycidyl ether of bisphenol A; quinoline diepoxide and the like, as well as mixtures thereof.

The triepoxides of the mixture contain three epoxide groups per molecule and are aliphatic, cycloaliphatic or aromatic triepoxides. Preferred triepoxides are the triepoxyalkanes containing 6 to 25 carbon atoms; the tri(epoxycyclohexane carboxylates) and the triglycidylethers of trihydric alcohols such as glycerol, 1,1,1-tri(hydroxymethyl)propane, 1,2,6-hexanetriol and the higher alcohols containing up to about 25 carbon atoms; and the triglycidyl ethers of trihydric phenols, such as phloroglucinol, the trihydroxydiphenyl methanes and propanes, the trihydroxyaminophenols, the trisphenols; and the like as well as mixtures thereof. Typical triepoxides include triepoxyhexane; triepoxydecane; 2,3,6,7,11,12-triepoxydodecane; 2,3,5,6-diepoxy-9-epoxyethyldodecane; tris(3,4-epoxycyclohexanecarboxylate) of 1,1,1-trimethylol propane; tris(3,4-epoxycyclohexanecarboxylate) of 1,2,3-propanetriol; 2,2[2,4,4′-tris(epoxypropoxy) diphenyl]propane; 1,1-bis(glycidyloxymethyl)-3,4-epoxycyclohexane; N,N,O-tris-(epoxypropyl)p-aminophenol; and the like. Epoxide mixtures containing the diglycidylethers of bisphenol A and the triepoxides of the aminophenols are particularly preferred.

For best results, both the diepoxide and the triepoxide of the mixture will be in the relatively pure state, i.e., having a purity of about 95 to 100 percent in order that all of the available carboxy groups of the rubber will be incorporated into the gel network without wastage of any appreciable number of polymer chains as dangling ends which do not contribute to the gel network.

The ratio of the epoxy groups in the epoxide mixture to the carboxyl groups of the rubber in the binder should be in substantially stoichiometric proportions. Although a slight excess of either is not harmful, it is preferred that a slight excess of epoxy groups over carboxyl groups be present in the binder, generally at a mole ratio of epoxy groups to carboxy groups within the range of from 0.9:1 to 2:1.

The reaction of the carboxy terminated rubber with the above described epoxide mixture requires the presence of a catalyst which promotes the carboxyl-epoxide reaction. Catalysts of this type must also have high activity in the presence of the other propellant ingredients, and must not adversely affect the desirable properties of the cured propellant, as by side reactions. The catalysts which have been found to fit all of the above requirements are chromium salts of aliphatic carboxylc acids containing 2 to 22 carbon atoms and preferably 2 to 18 carbon atoms, chromium naphthenate or vanadium naphthenate. The preferred catalysts include chromium acetate, chromium 2-ethylhexanoate, chromium neodecanoate, chromium stearate, chromium oleate, chromium naphthenate and vanadium naphthenate. The amount of catalyst necessary to promote the reaction will, of course, depend on many factors, as for example, on the particular salt employed, the binder materials and other propellant ingredients present and the cure rate desired. In general, the amount utilized will vary from a very small catalytic amount up to about 0.1 percent of the propellant composition and preferably will be from about 0.005 percent to about 0.03 percent by weight of the composition.

The solid oxidizer component of the propellants of the invention is preferably an inorganic oxidizing salt, a number of which are well known to the art. Typical of such inorganic salts are the ammonium, alkali metal, or alkaline earth metal salts of nitric, perchloric, or chloric acids or mixtures thereof, and particularly such salts as ammonium perchlorate, sodium perchlorate, potassium perchlorate, magnesium perchlorate, lithium chlorate, strontium chlorate, potassium nitrate, sodium nitrate, calcium nitrate, ammonium nitrate, and the like. Other solid oxidizers such as cyclotetramethylene tetranitramine, cyclotrimethylene trinitramine, nitroguanidine, and the like can be substituted for all or part of the inorganic oxidizing salt, if desired. The phenylenediamine antioxidant components are, in preferred practice, N,N′-dialkyl-p-phenylenediamines wherein each alkyl contains at least 4 carbon atoms, generally from 4 to 10 carbon atoms. However, suitable N,N′-dialkylphenylenediamine antioxidants wherein the alkyl contains a number of carbon atoms outside the above range can be used when desired. A now preferred aryl substituted phenylenediamine is N,N′-diphenyl-p-phenylenediamine. Exemplary phenylenediamine antioxidant components of the invention are the p- phenylenediamines, N,N'-dihexylphenylenediamine, N,N'-diheptylphenylenediamine, N,N'-bis(1-methylheptyl)phenylenediamine, N,N'-di(2-ethylhexyl)phenylenediamine, N,N'-bis(1-ethyl-3-methylpentyl)phenylenediamine, N,N'-bis(1-methylpentyl)phenylenediamine, N,N'-bis(1-methylbutyl)phenylenediamine, N,N'-bis(isobutyl)phenylenediamine and N,N'-bis(n-butyl)phenylenediamine.

The interferent material, as a coating, or stain, is applied to the initial burning surface in any suitable manner. The coating material is generally dissolved in a solvent sufficiently volatile to be easily removed early in the second curing stage, or merely upon standing prior to that time. Exemplary solvents are benzene, tetrahydrofuran, chloroform, methylene chloride and 1,1,2-trichloro-1,2,2-trifluoroethane.

The amount of interferent material applied to the initial burning surface is generally from about 5 to $50 \times 10^{-4}$ grams (after solvent removal) per square centimeter. The amount, of course, varies somewhat dependent upon the particular interferent material. For example, when the rubber base is a carboxy terminated polybutadiene cured with a di/triepoxide curing agent in the presence of chromium 2-hexanoate as a catalyst for the curing reaction, and 8-hydroxyquinoline is the interferent material (functioning as a chelating agent) an amount of from about 5 to $20 \times 10^{-4}$ grams (after solvent removal) per square centimeter of port surface area is advantageously utilized.

When applying the interferent material to the initial burning surface there is a slight migration of a portion of the material into the adjacent propellant mass, often amounting to a penetration in the order of from about 0.1 to 0.6 inch. The amount of migrating interferent material depends upon such variables as the amount initially added to the initial burning surface, size of the molecule of interferent material, and solubility of the interferent material in the plasticizer. Accordingly, although the curing reaction is substantially stopped by the interferent material at the initial burning surface, the extent of interference in the penetrated propellant mass adjacent the treated burning surface is somewhat less.

Although it is generally preferred to apply the interferent material to the entire initial burning surface, it is often sufficient in those instances, wherein there is a concentration of strain, to apply the interferent material only to that particular area, i.e. without regard to the remaining portion of the initial burning surface. By way of illustration the Advanced Sparrow motor has an outside diameter of 8 inches, an inside diameter of 2.25 inches and slot diameters of 5.8 inches; and strains due to cool-down from a cure temperature of 140° F. to a −70° F. operational level are concentrated in the slot areas and amount to about 17 percent at the −70° F. level. An interferent material as for example 8 hydroxyquinoline applied to those slot areas, even without application to the remainder of the burning surface, assures integrity of the burning system at a high mass ratio, even though the motor is repeatedly cycled from −65° to 165° F., is subjected to hot vibrational testing between cycles and is fired at −65° F. It is therefore within the scope of the invention to apply the interferent material to any part or to the entire initial burning surface, as desired.

EXAMPLE 1

In the following tabulation are illustratively shown formulations of propellants of the invention, together with interferent, mechanical properties, and effect of the interferent strain on volumetric loading efficiency in simple propellant motor configuration.

TABLE 1

| | Weight Percent | | | | |
|---|---|---|---|---|---|
| | I | II | III | IV | V |
| Propellant Composition | | | | | |
| AP (400μ)[1] | 31 | 31 | 31 | 31 | 31 |
| AP (200μ)[1] | 32 | 32 | 32 | 32 | 32 |
| AP (10μ)[1] | 20 | 20 | 20 | 20 | 20 |
| Al (10μ)[1] | 5 | 5 | 5 | 5 | 5 |
| Plasticizer | 4 | 4 | 3 | 3 | 4 |
| CTPB[2]-epoxides | 8 | — | — | — | 8 |
| HTPB[3]-isocyanate | — | 8 | — | — | — |
| MTPB[4]-isocyanate | — | — | 9 | — | — |
| ATPB[5]-isocyanate | — | — | — | 9 | — |
| CrOct[6] | 0.014 | — | — | — | 0.014 |
| Coating Agent (Interferent) | 8 HQ[7] | PFBI[8] | PFBI[8] | PFBI[8] | TCA[9] |
| Mechanical Properties at 77° F., 0.74 min$^{-1}$ | | | | | |
| Initial Burning Surface Tensile Strength, psi | 300 | 300 | 300 | 300 | 300 |
| Modulus, psi | 75 | 75 | 70 | 70 | 75 |
| Elongation at Max. Stress, percent | 60 | 50 | 35 | 45 | 60 |
| One inch from Initial Burning Surface Tensile Strength, psi | 500 | 500 | 500 | 500 | 500 |
| Modulus, psi | 100 | 100 | 100 | 100 | 100 |
| Elongation at Max. Stress, percent | 40 | 35 | 25 | 30 | 40 |
| Volumetric Loading Efficiency[10], percent | | | | | |
| Attained with surface stained (added interferent) | 96.3 | 95.3 | 93.2 | 94.8 | 96.3 |
| Attained with no interferent | 94.2 | 93.1 | 90.3 | 92.0 | 94.2 |

[1]Average particle size, microns
[2]Carboxy terminated polybutadiene
[3]Hydroxy terminated polybutadiene
[4]Mercaptan terminated polybutadiene
[5]Amine terminated polybutadiene
[6]Chromium octoate
[7]8 Hydroxyquinoline
[8]Perfluoro-benzene isocyanate
[9]Trichloroacetic acid
[10]Volumetric loading efficiency ($E_{vol}$) of propellant with given strain in a simple design geometry.

$E_{vol}$ is proportional to $1 - \left(\frac{a}{b}\right)^2$ (in percent) where "a" is inside grain radius and "b" is outside grain radius. $E_{vol}$ is for a motor which will not fail when Δ temperature is 225° F. and when firing is done at −65° F. and was determined using a factor of 0.604 times 77° F. elongation to account for strain allowables.

Table 1 illustrates effects of the interferent stain on the volumetric loading efficiency of propellants in the simple motor configuration. In all cases, the interferent results in increase in strain capability at the initial burning surface. Because of this elongation increase, the volumetric loading efficiency in the simple motor configuration is also increased. The magnitude of the increase in $E_{vol}$ tends to decrease as the initial strain capability increases since the plot of strain versus $E_{vol}$ is not a linear relationship and loading becomes progressively more difficult.

EXAMPLE 2

A propellant, for bonding in a casing to provide a case-bonded composite propellant rocket motor, was prepared as follows:

The uncured binder system of the propellant was prepared by forming a solution of 0.09 parts of a chromium 2-ethyl hexanoate, having a chromium content of 10.9 percent, in 64.4 parts of a carboxy terminated polybutadiene having a molecular weight of about 5000, a specific gravity of about 0.9 at 60°/60° F., a viscosity of 282 poises at 77° F., and a carboxyl content of about 0.0338 equivalents per 100 parts of polybutadiene; the carboxylated polybutadiene containing 1.34 weight percent of 2,2'-methylene-bis(4-methyl-6-tert-butyl)-phenol added as an antioxidant during its recovery from the reaction mixture from which it was formed, i.e. prior to its utilization as a binder component.

An epoxide curing agent, i.e., for the curing reaction for the carboxy terminated polybutadiene, was then added with stirring together with 16 parts by weight of dioctyl adipate and 15.88 parts of a liquid polybutadiene plasticizer for the binder. The epoxide curing agent was composed of a mixture of DER-332 (the condensation product of bisphenol A and epichlorohydrin) and ERL-0510 (N,N,O-tris-(epoxypropyl)-p-aminophenol), the resulting curing agent composition having a diepoxy/triepoxy ratio of 6½:1 and the COOH:epoxy ratio of the resulting curing reaction mixture being 1:1.

Preparation of the propellant formulation was completed in a 5 gallon, double-planetary blade, Day mixer at about 65° C. by adding to the above described binder solution in the mixer, and in the order given, 5 percent powdered aluminum (average particle size of 10 microns), microatomized ammonium perchlorate (average particle size, 10 microns), microatomized ammonium perchlorate (average particle size, 10 microns), unground ammonium perhclorate (average particle size, 200 microns) and spherical ammonium perchlorate (average particle size, 400 microns), in proportions of about 31:32:20 to produce a total of 83 percent trimodal ammonium perchlorate. The propellant formulation had a total epoxide:carboxy ratio of 1.00.

After a total mixing period of 90 minutes, the resulting slurry was transferred to a box constructed of high density polyethylene sheeting, the inside length, width and height dimensions were 15"×3"×19" with a side of the propellant ingredients-filled box having a removable high density polyethylene sheet whose dimensions were 15"×19". The thus packaged propellant ingredient formulation was placed in a curing oven under curing conditions at 150° F. for two days. At the end of that time, marking the end of partial time to impart sufficient cross-linking density for optimum strain capability and relatively low tensile strength and modulus at the propellant surface, the packaged propellant mixture was withdrawn from the oven and the polyethylene sheet removed.

The propellant surface exposed by removal of the polyethylene sheet, while at a temperature of about 100°-120° F., was then coated with approximately 35 grams of a benzene solution containing 5 percent of 8-hydroxyquinoline. The entire propellant ingredient package, i.e. the casting, was then returned to the oven for an additional cure of four days at 175° F., the end of that period marking the end of the complete cure to impart sufficient cross-linking throughout the remaining portions of the propellant (i.e., other than the propellant portion at and near the coated surface), to provide higher tensile strength and modulus and lower elongation. The ultimate properties were adequate for a satisfactory case bond-propellant adhesion.

The final casting, withdrawn from the curing oven, was machined to obtain short (four-inch) Type 2 JANAF dumbbell tensile specimens, ¼" thick. These specimens were taken from the block of cured propellant at various depths and tested for modulus and elongation as summarized in Table 2 following.

TABLE 2

| Total Depth from Coated Surface (mils) | Thickness (inch) | Modulus (psi) | Tensile Strength (psi) | Elongation, Percent at | |
|---|---|---|---|---|---|
| | | | | Max. Stress | Break |
| 250 | ¼ | 340 | 82 | 50 | 54 |
| 500 | ¼ | 460 | 98 | 39½ | 42 |
| 750 | ¼ | 500 | 101 | 39 | 42 |
| 1000 | ¼ | 510 | 104 | 39 | 41½ |

The data in Table 2 show that the strain capability of the upper 0.25 inch of propellant was considerably greater than that of the remainder of the propellant block. Modulus and tensile strength were considerably lower for the upper 0.25 inch of propellant, thus indicating that the crosslink density of the upper 0.25 inch of propellant was lower than that of the remainder of the propellant. Cure at the top propellant surface (initial burning surface) can not proceed upon addition of the interferent thereto.

EXAMPLE 3

Another set of JANAF dumbbell specimens of Example 2 was tested for mechanical properties at 77° F. after 0.5 month and again after 10 months. The results of these tests are summarized in the following tabulation:

TABLE 3

| | Mechanical Properties at 77° F. | | | |
|---|---|---|---|---|
| Months After Preparation | Modulus (psi) | Tensile Strength (psi) | Elongation, Percent | |
| | | | at Max. Stress | at 95 percent of Max. Stress |
| 0.5 | 340 | 82 | 50 | 54 |
| 10.0 | 380 | 90 | 47 | 50 |

The data of Table 3 show that cure is stopped at the initial burning surface immediately upon adding the interferent inasmuch as there is essentially no change in mechanical properties at the top (initial burning) surface after storage for 10 months at 70°-85° F. The small change in properties noted is readily attributed to thermal oxidative hardening, since the propellant composition contained no added antioxidant.

EXAMPLE 4

Values for mechanical properties at various depths after a propellant block product of the final casting, of Example 2, was stored at 70°-85° F. for six months are summarized in Table 4.

TABLE 4

| Total Depth From Stained Surface (mils) | Thickness (mils) | Modulus (psi) | Tensile Strength (psi) | Percent Strain at Max. Stress |
|---|---|---|---|---|
| 73 | 73 | 230 | 71 | 57 |
| 123 | 50 | 200 | 56 | 53 |
| 184 | 62 | 245 | 66 | 56 |
| 203 | 67 | 405 | 70 | 57 |
| | 55 | — | — | — |
| 317 | 59 | 240 | 64 | 54 |
| | 60 | — | — | — |
| 437 | 60 | 285 | 66 | 48 |
| | 60 | — | — | — |
| 556 | 59 | 305 | 65 | 42 |
| | 58 | — | — | — |
| 676 | 62 | 335 | 66 | 38 |
| | 57 | — | — | — |
| 793 | 60 | 320 | 66 | 38 |

TABLE 4-continued

| Total Depth From Stained Surface (mils) | Thickness (mils) | Modulus (psi) | Tensile Strength (psi) | Percent Strain at Max. Stress |
|---|---|---|---|---|
| | 57 | — | — | — |
| 911 | 61 | 315 | 64 | 41 |
| 970 | 59 | 330 | 67 | 38 |

The data of Table 4 were obtained from microtomed dumbbell specimens having an effective gauge length of 0.68 inch and thickness of from 50 to 90 mils.

The data of Table 4 show that strain capability is much greater at the top surface, i.e. at the initial burning surface, than in the bulk of the propellant; elongations at maximum stress were about 57 percent at top surface compared to about 40 percent for the completely cured propellant; and the data also show that strain capability gradually decreases with depth up to about 0.6 inch from the top surface. The high values for elongation are the result of the action of the interferent (8 HQ) to nullify curing catalyst activity at the propellant surface during the second stage of curing, i.e. after the partial cure at the initial burning surface is accomplished. High values for elongation in depth up to about 0.60 inch are therefore the result of migration of the interferent into the mass from the top surface and appear to be about proportional to the amount of the interferent applied to the surface and the time required for it to migrate into the propellant mass.

As will be evident to those skilled in the art, various modifications can be made or followed, in the light of the foregoing disclosure and discussion, without departing from the spirit or scope of the disclosure or from the scope of the claims.

What we claim and desire to protect by Letters Patent is:

1. A process for the manufacture of a cured, rubber base composite rocket propellant having a lower cross-link density at and adjacent at least a portion of its initial burning surface than throughout the remainder of the propellant, which process comprises (a) partially curing in its entirety an uncured composite propellant composition comprising solid oxidizer and a binder system containing a carboxy terminated rubber, hydroxy terminated rubber, mercapto terminated rubber or amine terminated rubber and a curing agent therefor until sufficient cross-linking has occurred to provide a predetermined strain capability at the initial burning surface; (b) applying to at least a portion of said initial burning surface sufficient of a monofunctional interferrent material reactive with said binder system to prevent further curing from occurring at said surface; and (c) then completing the cure of said propellant composition whereby the cross-link density and strength of the remaining curable portion of the propellant has increased.

2. The process of claim 1 wherein the partial curing step (a) imparts to the propellant at the initial burning surface a modulus of from 200 to 600 psi and an elongation at maximum stress of 40 to 100 percent, and the final curing step (c) imparts to the remainder of the propellant a modulus of from 400 to 2000 psi and an elongation at maximum stress of from 15 to 40 percent, each of said modulus and said elongation being measured at 77° F.

3. The process of claim 2 wherein the composite propellant contains on a weight basis from 70 to 90 percent of ammonium perchlorate, 5 to 10 percent of particulate aluminum and 5 to 20 percent binder.

4. The process of claim 3 wherein the binder system contains a carboxy terminated polybutadiene and, as curing agent therefor, a mixture of diepoxides and triepoxides in a diepoxide/triepoxide mole ratio of 15:1 to 1:1, the mole ratio of epoxy groups to carboxy groups in said binder being within the range of from 0.9:1 to 2:1.

5. The cured rubber base composite rocket propellant produced by the process of claim 1.

* * * * *

UNITED STATES PATENT AND TRADEMARK OFFICE
CERTIFICATE OF CORRECTION

PATENT NO. : 4,337,103
DATED : June 29, 1982
INVENTOR(S) : Donald E. Elrick & Harry Gilbert It is certified that error appears in the above–identified patent and that said Letters Patent are hereby corrected as shown below:

Col. 12, Table 1, Col. IV under heading "Mechanical Properties at 77°F., 0.74 min$^{-1}$", " 500 " fourth occurrence should read -- 600 --.

Signed and Sealed this

Twenty-fourth Day of August 1982

|SEAL|

Attest:

GERALD J. MOSSINGHOFF

Attesting Officer    Commissioner of Patents and Trademarks